July 5, 1966

F. L. STEEN 3,259,802

GROUND FAULT RESPONSIVE PROTECTIVE SYSTEM
FOR ELECTRIC POWER DISTRIBUTION APPARATUS

Filed June 3, 1963

INVENTOR:
FLOYD L. STEEN,
BY Albert S. Richardson Jr.
ATTORNEY.

INVENTOR:
FLOYD L. STEEN,
BY Albert S. Richardson Jr.
ATTORNEY.

July 5, 1966 F. L. STEEN 3,259,802
GROUND FAULT RESPONSIVE PROTECTIVE SYSTEM
FOR ELECTRIC POWER DISTRIBUTION APPARATUS
Filed June 3, 1963 4 Sheets-Sheet 4

INVENTOR:
FLOYD L. STEEN,
BY Albert S. Richardson Jr.
ATTORNEY.

United States Patent Office 3,259,802
Patented July 5, 1966

3,259,802
GROUND FAULT RESPONSIVE PROTECTIVE SYSTEM FOR ELECTRIC POWER DISTRIBUTION APPARATUS
Floyd L. Steen, Lansdowne, Pa., assignor to General Electric Company, a corporation of New York
Filed June 3, 1963, Ser. No. 284,934
12 Claims. (Cl. 317—18)

This invention relates to ground fault responsive protective systems for electric power distribution apparatus, and more particularly it relates to a substantially instantaneously selective relaying arrangement capable of providing ground fault protection for both the apparatus itself and the distribution circuits which are connected thereto.

It is customary in the art of electric power distribution to locate within a grounded sheet-metal housing a multi-conductor electric power bus and a plurality of circuit controlling means connected thereto. Such apparatus, generally known as "switchgear," is designed to provide in one integral "package" or substation the requisite means for safely and reliably controlling and protecting many different feeders or utilization circuits which are supplied from a common source of electricity.

The fault protective schemes for electric power distribution systems ordinarily include means for quickly sensing and individually isolating any short circuit occurring in the respective feeder circuits. For complete fault protection additional means is provided to disconnect the entire apparatus from its source of electric energy if a fault condition should develop on the electric power bus within the above-mentioned housing. This latter region or zone of protection will be referred to hereinafter as "internal," in contrast to those "external" regions located along the individual feeders or at the ultimate electric loads connected thereto. My invention is designed to discriminate between internal and external faults and to provide selective protection against both.

The design of a successful fault protective scheme is always influenced by the conventional criteria of sensitivity, speed and economy. Sensitive and high-speed operation is important in order to deenergize the faulted section of the power system before extensive damage can result, thereby minimizing the length (and hence the inconvenience and expense) of "down" time required to repair the damage and restore service. However, the sensitivity and speed of operation must be consistent with the need for selective response. That is, the scheme should instantly respond only to those faults occurring in the intended zone of protection, thereby avoiding unnecessary interruption in service to the remaining sound sections of the system. In low voltage (e.g. 600 volts A.-C.) distribution apparatus the problem of economically providing selective external and internal fault protection which nicely satisfies the companion goals of minimizing damage and maximizing service continuity is particularly difficult in situations where a fault involves an electric arc to ground. The general nature of the unique problem of ground faults is fully explained in a paper written by R. H. Kaufmann and J. C. Page, "Arcing-Fault Protection for Low-Voltage Power Distribution Systems," 79 A.I.E.E. Transactions, Part III, Power Apparatus and Systems 160 (June 1960), and it will only briefly be referred to here.

The magnitude of short-circuit current which flows as a result of a typical ground fault in a grounded low voltage power distribution system may be low compared to the magnitude of transient load currents normally expected in the system. Therefore any instantaneously operative protective device set high to override such transient load currents and to meet the requirements of selective response will not provide adequately sensitive protection against ground faults. While a relatively low-set time delay protective device may, on the other hand, sense the fault and eventually operate to clear it, by then considerable damage may have been done to the apparatus, and possible injury to personnel may result.

Heretofore the desired fast yet selective clearing of ground faults has been best obtained by using a form of protection known in the art as "differential" relaying. Such a technique provides completely satisfactory protection, but due to its high degree of sophistication it is relatively expensive, needs a relatively large amount of space and requires careful application. Its cost may be prohibitively high when compared to the cost of the circuit interrupters and associated equipment used in low voltage distribution apparatus.

It is a general object of my invention to provide an improved protective system which is capable of high-speed yet selectively coordinated response to low-level internal and external ground faults in electric power distribution apparatus.

Another object of my invention is the provision, for selectively responding to internal and external ground faults in electric power distribution apparatus, of a sensitive protective system which requires substantially no time delay for effecting deenergization of the apparatus when an internal fault occurs and which permits external fault protection to be delayed in order to give downstream protective devices preferential opportunity to clear the same.

Yet another object of the invention is the provision of a relatively simple and inexpensive ground fault protective system utilizing a monitoring principle to obtain substantially instantaneous selective coordination between its response to external ground faults and its response to internal ground faults.

A further object is to provide a ground fault responsive protective system of the character described wherein only "static" components are employed (i.e., solid-state circuit components having no moving parts).

In carrying out my invention in one form, I provide a ground fault protective system for electric power distribution apparatus which is energized from a source of electric energy having one terminal adapted for grounding. The apparatus includes a conventional multiconductor electric power bus connected to the source by way of main switching means openable to deenergize the bus, and at least one circuit controlling means is included for connecting at least one multiconductor feeder or distribution circuit to the bus. The protective system which I provide comprises feeder relaying means and main relaying means. The main relaying means is normally operative in response to ground current flowing through the main switching means for initiating an opening operation thereof. The feeder relaying means is arranged to operate when ground fault current flows through the circuit controlling means to substantially instantaneously block operation of the main relaying means, thereby preventing opening of the main switching means under external ground fault conditions. Operation of the feeder relaying means also initiates opening of the circuit controlling means to complete the protection afforded by my relaying system. In one aspect of my invention the main and feeder relaying means comprise combinations of all static circuit components so arranged and interconnected as to carry out the above-mentioned functions.

My invention will be better understood and its various objects and advantages will be more fully appreciated from the following description taken in conjunction with the accompanying drawings in which.

Figure 1:
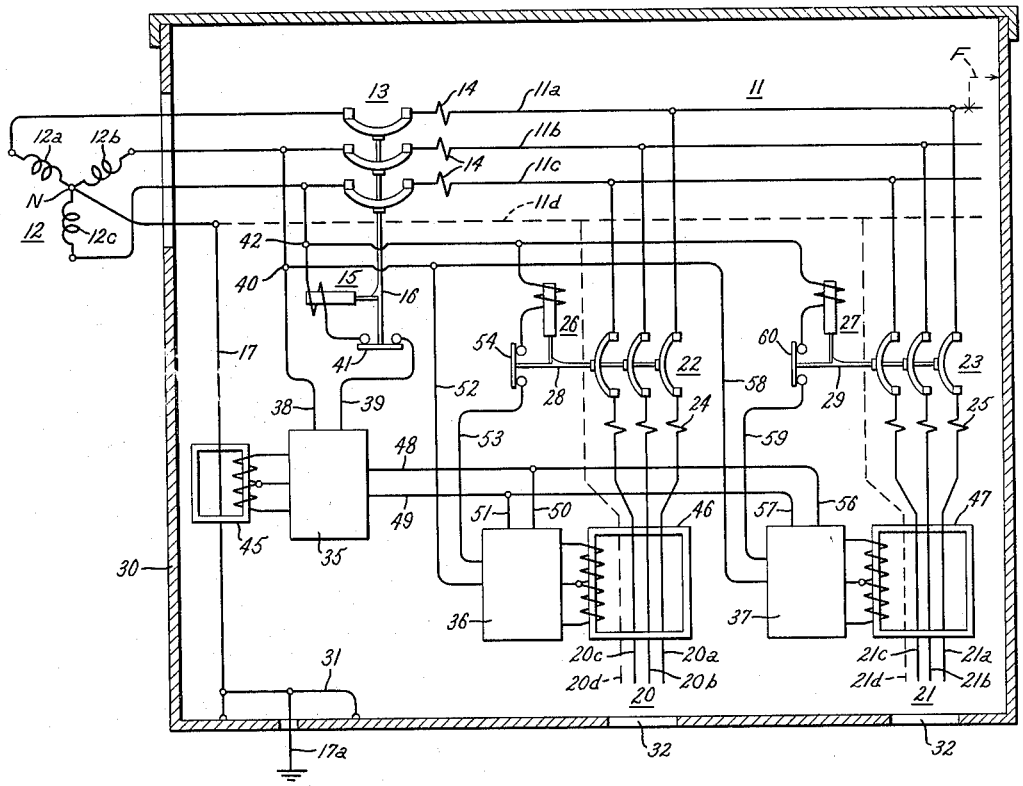
FIG. 1 is a schematic representation of electric power distribution apparatus protected against external and internal ground faults by a relaying system embodying my invention, the relaying system being shown partly in block form.

Referring now to FIG. 1, the illustrated apparatus will be seen to comprise an electric power bus 11 having three separate phase conductors 11a, 11b and 11c. The bus 11 is arranged for energization from an electric power source 12 to which it is connected by suitable means, including main switching means 13. The switching means 13 as shown comprises a 3-pole circuit breaker equipped with phase overload trip elements identified by the reference numeral 14, and this breaker is further equipped with a shunt trip device 15 which operates, when energized, to release a latch 16 thereby enabling an opening spring (not shown) to effect high-speed opening of its switch contacts. The combination of the shunt trip device and latch is intended to be representative of but one of several suitable arrangements (e.g., a holding coil) that could be used with my invention to effect an opening operation of the switching means 13.

In the illustrated embodiment of the invention, the source of electric energy to which the main circuit breaker 13 is adapted to be connected comprises the star-connected secondary windings 12a, 12b and 12c of a 3-phase A.-C. electric power transformer. The primary of the transformer 12 has not been shown. The three secondary windings 12a, 12b and 12c are respectively connected, by way of the main breaker 13, to the three conductors 11a, 11b and 11c of the bus 11. A neutral terminal N of the transformer is adapted for grounding, for which purpose an interconnecting member 17 is furnished. This grounding connection 17 can be made solidly to ground, as shown, or through an appropriate low impedance element. In 4-wire distribution systems, an insulated neutral bus 11d would be connected to the terminal N, but since this is optional, a broken-line showing of the neutral bus has been employed in FIG. 1. Those skilled in the art will understand that the illustrated distribution apparatus could alternatively be energized by electric power sources other than the particular arrangement shown. For example, the transformer secondary windings might be connected in delta, with a mid-tap of one of the windings being adapted to be grounded.

The electric power bus 11 is tapped by a plurality of multiconductor feeder or distribution circuits. Two feeder circuits 20 and 21 are shown in FIG. 1 for purposes of illustration. The feeder circuit 20 comprises three phase conductors 20a, 20b and 20c (and a neutral conductor 20d if desired), and a 3-pole circuit controlling means 22 as provided for connecting these phase conductors to the respective phase conductors of the main bus 11. The feeder 21 also comprises three phase conductors 21a, 21b and 21c (and a neutral conductor 21d if desired), and another 3-pole circuit controlling means 23 is provided for connecting these phase conductors to the respective conductors of the bus 11. The circuit controlling means 22 and 23 are shown as circuit breakers which may be opened and closed to individually control the distribution of electric power from the main bus 11 to the respective feeder circuits 20 and 21. For protection purposes, these breakers are equipped with conventional phase overload trip elements, identified by the reference numerals 24 and 25 respectively, and each has suitable control means—such as a shunt trip device (26 and 27, respectively) which operates, when energized, to release a latch (28 and 29, respectively)—for effecting high-speed opening of its switch contacts. Each of the circuit breakers 22 and 23 when open disconnects the associated feeder circuit from the bus 11.

The electric power bus 11, the three circuit breakers 13, 22 and 23, and the interconnecting member 17 are all physically housed in a grounded metal structure 30. The enclosing structure or housing 30 is electrically connected by means of an equipment ground bus 31 and terminal segment 17a of the member 17 to the symbolically illustrated station ground. The station ground may actually be a cold water pipe, building steel or the like. Appropriate openings 32 are provided in the housing 30 to enable the feeders 20 and 21 to leave the illustrated switchgear assembly and extend to remotely located loads or other distribution assemblies (not shown).

According to my invention, the electric power distribution apparatus located in the housing 30 as shown in FIG. 1 is protected against ground faults by a protective scheme which will now be described. My protective scheme in essence comprises main relaying means 35 associated with the main circuit breaker 13 and normally activated by low-level ground current flowing through the main breaker for effecting an opening operation thereof, and feeder relaying means 36 and 37, respectively associated with the feeder circuits 20 and 21 and responsive to low-level ground current flowing therein, for substantially instantaneously preventing activation of the main relaying means 35 and for initiating opening of the associated feeder breaker (22 and 23, respectively).

This scheme is operative to protect the apparatus upon the occurrence of either an external ground fault or an internal ground fault. In both cases the main relaying means 35 tends to respond in a manner to open the main breaker 13. But any ground fault which in fact is external will cause operation of one of the feeder relaying means 36 or 37 which instantaneously disables the main relaying means 35, thereby preventing or blocking the opening of the main breaker. Thus my relaying system, with no intentional time delay and independently of relative magnitudes of fault current, properly discriminates between an internal arcing ground fault (involving the electric power bus 11 as indicated for example at "F" in FIG. 1) and an external one (involving one of the feeder circuits 20 and 21). The main relaying means 35 is able to and does effect opening of the main breaker 13, thereby deenergizing the whole apparatus, only when an internal ground fault occurs; all external ground faults will be preferentially cleared by the opening of a feeder breaker 22 or 23 in response to operation of the affected feeder relaying means 36 or 37.

The main relaying means 35, shown in block form in FIG. 1, comprises a unit having a pair of output leads 38 and 39. One output lead 38 is connected to a control power terminal 40, while the other lead 39, in series circuit relationship with the shunt trip device 15 and a normally open auxiliary contact 41 of the main circuit breaker 13, is connected to a companion control power terminal 42. Although the terminals 40 and 42 are shown in FIG. 1 connected, in turn, to two of the phase conductors connecting the main breaker 13 to the secondary windings of transformer 12, it will be understood by those skilled in the art that these terminals may be energized alternatively from other suitable sources of control power, either A.-C. or D.-C. The main relay 35 when in operation is effective through its output leads 38 and 39 to complete the energizing circuit for the shunt trip device 15, thereby initiating a circuit opening operation of the main breaker 13.

The main relay unit 35 is arranged normally to be operative in response to ground current flowing through the main breaker 13, and for this purpose it is connected to ground current sensing means 45 which, as shown in FIG. 1, is coupled in turn to the conductive member 17 interconnecting the neutral N of transformer 12 and ground. The sensing means 45, illustrated in FIG. 1 as a window type current transformer, derives an electric signal dependent on the flow of current in the grounding connection 17, and the relay unit 35, being energized thereby, becomes operative (unless operation is blocked as will be explained below) when this signal attains a predetermined "pickup" magnitude.

The current detected by the sensing means 45 is the same as the ground current flowing through the main circuit breaker 13. This is because the grounding connection 17 constitutes a return path for whatever ground current flows from the electric power source 12 to any phase-to-ground fault occurring "down-stream" from the main breaker 13 (e.g., a short circuit between the phase conductor 11a of bus 11 and the grounded housing 30 as indicated at F in FIG. 1), and consequently the pickup magnitude of the signal derived by the sensor 45 is indicative of the flow of ground current exceeding a predetermined amount through the main breaker 13. Although a window type current transformer coupled to the grounding connection 17 has been illustrated by way of example in FIG. 1, those skilled in the art will recognize that the ground current sensing means 45 could take other functionally equivalent forms and could alternatively be coupled directly to the phase conductors interconnecting breaker 13 and transformer 12. Illustrative examples of such alternative arrangements have been shown in some of my other figures which are described hereinafter.

As can be seen in FIG. 1, a pair of leads 48 and 49 interconnect the main relay unit 35 and both of the feeder relaying means 36 and 37. The main relay unit 35 is so arranged that its operation is blocked by a monitoring signal which is conveyed to it by these leads in response to ground current flowing through any one of the feeder breakers 22 and 23. This is the above-mentioned blocking or disabling action which prevents the main relay unit from effecting opening of the main circuit breaker 13 in the event of an external ground fault.

The feeder relaying means 36, shown in block form in FIG. 1, comprises a unit arranged to be operative in response to ground current flowing through the feeder circuit breaker 22, and for this purpose the unit 36 is connected to ground current sensing means 46. The sensing means 46, as it is shown in FIG. 1, comprises a window type current transformer embracing the conductors 20a, 20b and 20c (and 20d if used) in close proximity to feeder breaker 22. It derives an electric signal dependent on the flow of ground fault current in the feeder circuit 20 (i.e., the zero-phase-sequence component of feeder current flowing to an external phase-to-ground fault occurring down stream from the feeder breaker 22). The feeder relay unit 36, being energized by the signal derived by the sensor 46, becomes operative when this signal attains a "pickup" magnitude indicative of the flow of ground current exceeding a predetermined amount through the feeder breaker 22. Those skilled in the art will recognize that ground current sensing means 46 could take functionally equivalent forms other than that illustrated by way of example in FIG. 1.

The feeder relay unit 36 has two pairs of output leads 50, 51 and 52, 53. The leads 50 and 51 are respectively connected to the leads 48 and 49 and hence to the main relay unit 35. By means of these interconnecting leads, the feeder relay conveys to the main relay a monitoring signal provided by the former immediately upon operation thereof, whereby the main relay 35 is disabled as explained above. With this blocking arrangement it is unnecessary to set the pickup level of the main relay 35 appreciably higher than the pickup level of the feeder relay 36 in order to ensure proper selective coordination between these parts of my protective system in their responses to external ground faults. In other words, the main relay 35 may be as sensitive as the feeder relay 36 and therefore detect the same ground current as the latter relay detects when a ground fault occurs on the feeder circuit 20, for in this circumstance the main relay is nevertheless prevented from effecting opening of the main circuit breaker 13 and the electric power bus 11 will consequently remain in service while the faulted feeder alone is disconnected in response to operation of the feeder relay.

The output leads 52 and 53 of the feeder relay unit 36 are connected, respectively, to the control power terminals 40 and 42, with the shunt trip device 26 and a normally open auxiliary contact 54 of the feeder circuit breaker 22 being serially connected between terminal 42 and lead 53. A circuit opening operation of the feeder breaker 22 is initiated upon completion of the energizing circuit for the shunt trip device 26 through the output leads 52 and 53 in response to operation of the feeder relay 36. The feeder relay can be arranged to effect this result substantially instantaneously upon operation thereof, or a preselected time delay might be introduced to delay the initiation of the opening of breaker 22 in order to allow this breaker to coordinate selectively with downstream protective devices connected to the feeder circuit 20.

It should be emphasized here that the blocking function of the feeder relay 36, described hereinbefore, is always performed instantaneously even though the breaker opening function of the same relay is delayed, and therefore it is unnecessary to introduce time delay in the operation of the main relay 35 in order to ensure selective coordination between main and feeder relays. Whenever an internal ground fault occurs, operaton of the main relay need not wait to make sure that a feeder breaker would have prior opportunity to clear the fault if instead it had been external. This means that my protective system is able to realize high-speed response to any internal ground fault and either high-speed or delayed response, as desired, to external ground faults.

The feeder relay means 37 associated with the second feeder circuit 21 illustrated in FIG. 1 is arranged and connected in the same manner as feeder relay 36. Thus the unit 37 is connected to the ground current sensing means 47 for energization by an electric signal dependent on the flow of ground current through the feeder circuit breaker 23. One pair of output leads 56 and 57 of unit 37 is connected, in common with the output leads 50, 51 of feeder relay 36, to the leads 48 and 49 of the main relay unit 35, and in this manner the feeder relay unit 37 supplies a monitoring signal for disabling the main relay in substantially instantaneous response to ground current flowing in the feeder circuit 21. Another pair of output leads 58 and 59 of the feeder relay 37 interconnects the shunt trip device 27 and a normally open auxiliary contact 60 of the feeder circuit breaker 23 with the control power terminals 40 and 42, whereby a circuit opening operation of the breaker 23 is initiated in either instantaneous or delayed response to operation of this relay.

Figure 2:
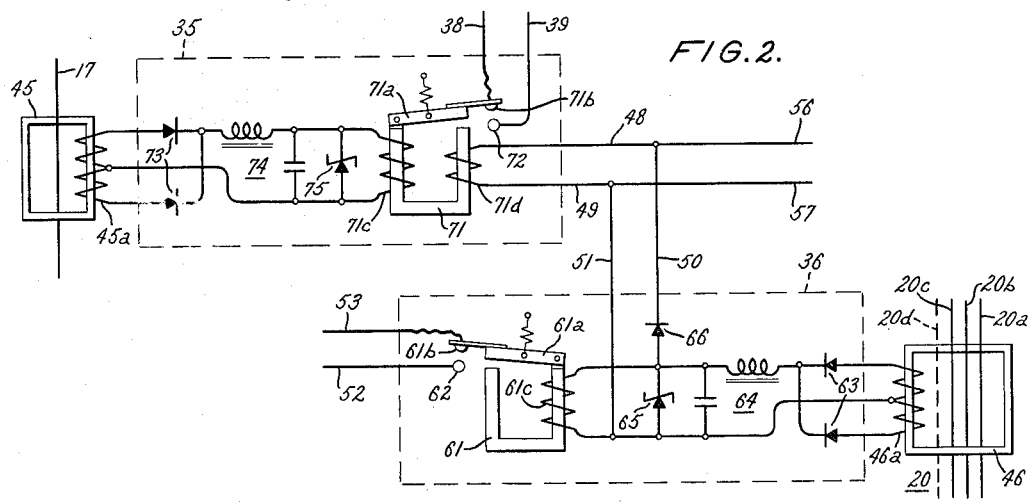
FIG. 2 is a circuit diagram illustrating one embodiment of the relaying system shown in block form in FIG. 1.

FIG. 2 is a detail circuit diagram of a particular embodiment of the main and feeder relay units 35 and 36 which are shown in block form in FIG. 1, and this embodiment will now be described. As it is shown in FIG. 2, the feeder relay unit 36 comprises an electromagnetic relay 61 having an armature 61a which carries an electric contact 61b into engagement with a cooperating contact 63 upon movement of the armature to an attracted position in response to energization of an operating coil 61c. The contacts 61b and 62 are respectively connected to the output leads 53 and 52 of unit 36; when engaged these contacts complete the energizing circuit of the shunt trip device 26 of the associated feeder breaker 22 (FIG. 1). If desired suitable means (e.g., a dashpot) can be added to the relay 61 shown in FIG. 2 for retarding movement of the armature 61a for the purpose of delaying the opening of the feeder breaker 22 in response to operation of unit 36.

The operating coil 61c of relay 61 is supplied by a D.-C. energizing signal which is derived by the current sensor 46 from arcing ground fault current flowing in the feeder circuit 20. As can be seen in FIG. 2, the sensor 46 comprises a midtapped secondary winding 46a on a magnetizable frame encircling all four conductors 20a through 20d, and the magnitude of current in this winding is dependent on the amount of current flowing from the power source through the encircled phase conductors to a remote arcing ground fault and returning to the source by some external ground path. A pair of diodes 63 and an LC filter 64 are interconnected with the two halves of winding 46a to form a full-wave rectifier and smoothing circuit, the D.-C. output of this arrangement comprising an input signal which is applied to the coil 61c. The filter 64 is designed to reduce ripple voltage across the coil 61c without significantly delaying input signal increase in response to increasing ground current.

The relay 61 becomes operative (i.e., armature 61a can move to its attracted position) when the input signal energizing the coil 61c attains a critical pickup magnitude which will produce sufficient M.M.F. for this purpose. The sensitivity of the relay is preferably so determined that the pickup magnitude of the input signal is attained at a level of ground current in the feeder circuit 20 which is less than the amount expectable on the occurrence of any ground fault condition in the particular zone of the power system which the unit 36 is protecting. In order to limit the maximum M.M.F. produced in the operating coil 61c at high multiples of pickup, a Zener diode 65 is connected across this coil as shown in FIG. 2.

The input signal applied to the operating coil of the electromagnetic relay 61 in the feeder relay unit 36 also serves as a monitoring or blocking signal which is conveyed to the main relay unit 35 by way of the output leads 50, 51 and leads 48, 49. As is shown in FIG. 2, a diode 66 is provided for connecting the lead 50 to the signal source in the feeder relay 36, whereby the operating coil 61c is isolated from the monitoring signal which the companion feeder relay (not shown) supplies to the main relay unit via leads 56, 57, upon the occurrence of an external ground fault in the other feeder circuit.

As it is shown in FIG. 2, the main relay unit 35 comprises an electromagnetic relay 71 having an armature 71a which carries an electric contact 71b into engagement with a cooperating contact 72 upon movement of the armature to an attracted position in response to energization of an operating coil 71c. The contacts 71b and 72 are respectively connected to the output leads 38 and 39 of unit 35; when engaged these contacts complete the energizing circuit of the shunt trip device 15 of the main circuit breaker 13 (FIG. 1). The operating coil 71c of relay 71 is supplied by a D.-C. energizing signal which is derived by the current sensor 45 from arcing ground fault current flowing in the grounding connection 17. The sensor 45 comprises a midtapped secondary winding 45a on a magnetizable frame encircling the conductor 17, and the magnitude of current in this winding is dependent on the amount of current flowing from the power source through the main circuit breaker to any arcing ground fault (either internal or external) and returning to the grounded terminal of this source through conductor 17. A pair of diodes 73 and an LC filter 74 are interconnected with the two halves of winding 45a to form a full wave rectifier and smoothing circuit whose D.-C. output comprises an input signal which is applied to coil 71c. The filter 74 reduces ripple voltage across the coil 71c without significantly delaying the operation of the relay in response to increasing ground current.

The relay 71 normally becomes operative when the input signal energizing the coil 71c attains a critical pickup magnitude which will produce sufficient M.M.F. for this purpose. The sensitivity of the main relay unit is preferably about the same as but no greater than that of the feeder relay unit described above. That is, the amount of ground current required in the grounding connection 17 in order to render the main relay operative should be not less than the ground current level which causes operation of a feeder relay. In order to limit the maximum M.M.F. that can be produced in the operating winding 71c at high multiples of pickup, a Zener diode 75 is connected thereacross as shown.

The electromagnetic relay 71 includes a restraining coil 71d, which is connected across leads 48 and 49 and poled in an opposite sense to the operating coil 71c, for preventing operation of this relay whenever the magnitude of the monitoring signal supplied by the feeder relay 36 exceeds an amount equal to the magnitude of the input signal being applied to winding 71c less the aforesaid pickup magnitude of relay 71. So long as the restraining coil 71d is energized by a monitoring signal provided by a feeder relay unit, it produces in the relay 71 and M.M.F. opposing that produced by operating winding 71c, and the net M.M.F. acting on the armature 71a is reduced accordingly. The relay is arranged (by appropriately selecting the relative number of turns of the coils 71c and 71d and the relative magnitudes of the signals by which these coils are respectively energized), so that its net M.M.F. is insufficient to attract the armature 71a when the same amount of ground current flows in both the grounding connection 17 and a feeder circuit (indicating an external fault). By using the limiters 75 and 65 I can obtain this disabling effect regardless of how high the ground current becomes during external fault conditions. The LC filter 74 tends to minimize the transforming action between the operating and restraining coils 71c and 71d.

It is now apparent that the protective arrangement illustrated in FIG. 2 provides the desired selective coordination between main and feeder relay responses. The main relay unit 35 is able to operate to effect opening of the main circuit breaker only on the occurrence of an internal ground fault, in which event the operating coil 71c is energized by a signal of at least pickup magnitude while the restraining coil 71d remains deenergized. On the other hand, if an external ground fault should occur in the feeder circuit 20, the feeder relay unit 36 responds by immediately effecting energization of the restraining coil 71d, thereby instantaneously disabling the main relay unit even though an energizing signal is being simultaneously applied to its operating coil 71c. Operation of the feeder relay unit 36 also initiates opening of the feeder breaker, thereby isolating the faulted feeder circuit.

It will be recognized by those skilled in the art that the blocking or disabling function of the feeder relay unit could be accomplished in a manner different than that particularly shown in FIG. 2. For example, one simple modification might be the utilization, in the feeder relay unit, of an electromagnetic relay having a second normally open pair of contacts connected in shunt with the operating winding of the main relay.

Figure 3:
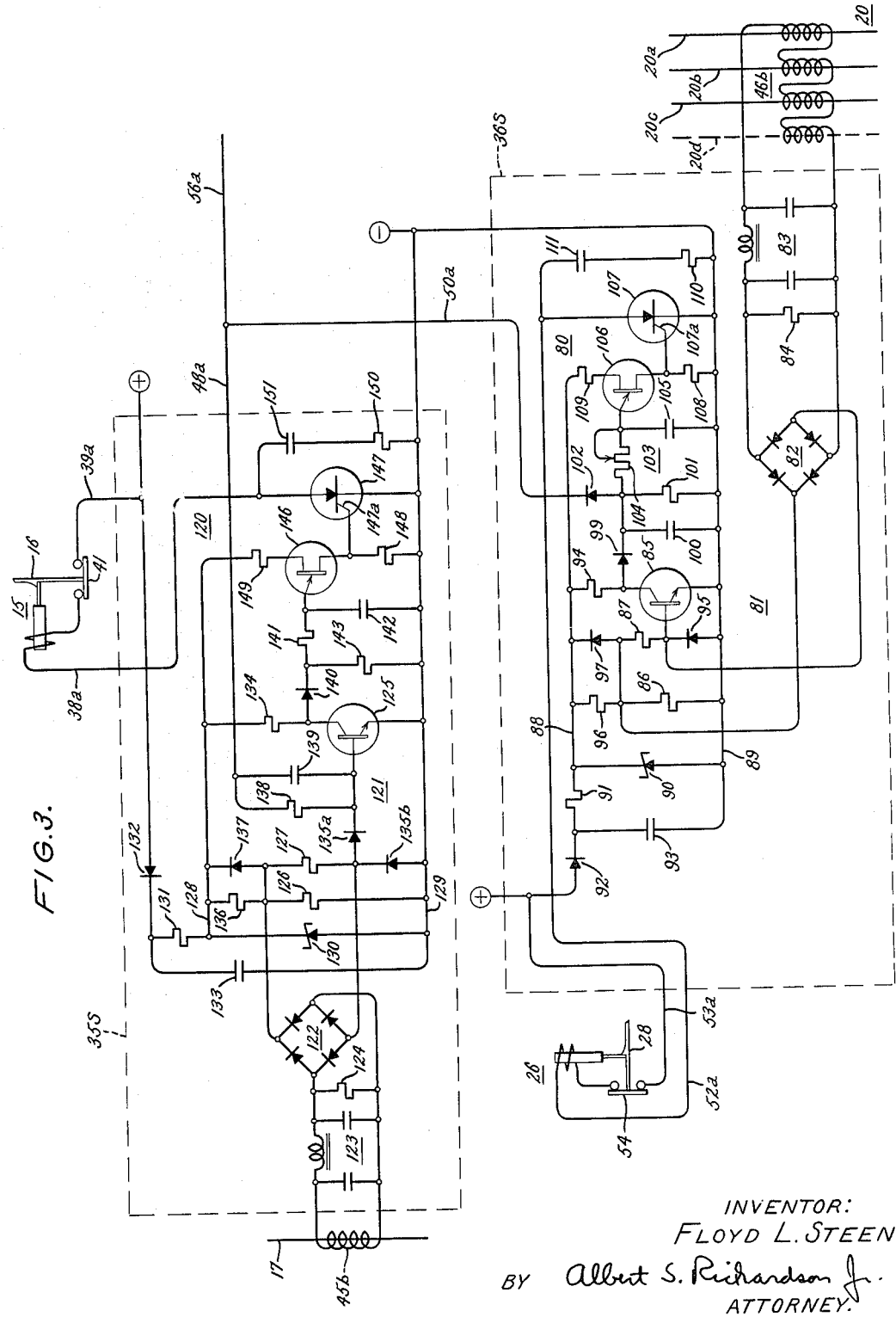
FIG. 3 is a circuit diagram similar to FIG. 2 and illustrating the preferred embodiment of the invention.

FIG. 3 is a detail circuit diagram of the preferred embodiment of the main relay and one of the feeder relay units which were shown in block form in FIG. 1. This embodiment employs all static components, and it will next be described. Note that in FIG. 3 the main and feeder relay units have been identified, respectively, by the reference characters 35s and 36s in order to distinguish them from the first embodiment (FIG. 2) of the corresponding units 35 and 36.

The feeder relay unit 36s shown in FIG. 3 comprises in essence two interconnected sections. One section comprises normally inactive electroresponsive means 80 which, when activated, effects opening of the feeder circuit breaker 22 (FIG. 1) by supplying via output leads 52a and 53a a tripping signal to the shunt trip device 26 of this breaker. The other basic section of the feeder relay 36s comprises control means 81 which activates the electroresponsive means 80 and produces a monitoring or blocking signal at output lead 50a in response to energization by a D.-C. input signal derived from ground current flowing in the feeder circuit 20.

The input signal for the control means 81 of the feeder relay 36s is obtained from D.-C. terminals of a full-wave bridge rectifier 82. The A.-C. terminals of this rectifier are energized by an A.-C. signal taken from a current sensor 46b which is coupled to the feeder circuit 20. In order to reduce relay sensitivity to current transients and harmonics such as those present with fluorescent lighting loads, a constant-$k$ low pass $\pi$-section filter 83 tuned to fundamental power frequency is connected between the sensor 46b and the rectifier as shown. An impedance-matching resistor 84 has been connected across the A.-C. terminals of rectifier 82 to improve relay performance at low signal levels.

As it is shown in FIG. 3, the sensor 46b comprises a plurality of serially interconnected air core transformers individually coupled to the respective phase conductors 20a, 20b and 20c (and 20d if used) of the feeder circuit 20. Each of these transformers (known as linear magnetic couplers) develops a voltage representative of the current in the associated conductor, and the vector sum of these voltages, which sum is appiled to the filter 83, will be dependent on the amount of current flowing from the power source through the feeder conductors to a remote arcing ground fault and returning to the source by some external ground path.

Operation of the feeder relay 36s is obtained when the input signal provided by rectifier 82 attains a predetermined instantaneous pickup magnitude. This pickup magnitude is determined by the parameters of a level detecting circuit in the control means 81. The level detecting circuit comprises an NPN transistor 85, two interconnected resistors 86 and 87, and a pair of leads 88 and 89 energized by a regulated D.-C. supply voltage. The supply voltage is taken from across a voltage stabilizing element 90, shown in FIG. 3 as a Zener diode, which is connected in series with a dropping resistor 91 and a diode 92 to a suitable source of D.-C. control power represented by the encircled plus and minus symbols + and —. The symbolically illustrated control power source may, for example, comprise appropriate transforming and rectifying means (not shown) arranged for energization from the three phases of the electric power source 12 (FIG. 1), and in this event a smoothing capacitor 93 is connected in parallel with the dropping resistor 91 and stabilizing element 90 as shown. The lead 88 is connected to the relatively positive terminal of element 90 and will be referred to hereinafter as a supply voltage bus, while the lead 89 to which the relatively negative terminal of element 90 is connected will be referred to hereinafter as a reference bus.

The transistor 85 has an emitter, collector and base electrode. As can be seen in FIG. 3, the emitter of this transistor is connected directly to the reference bus 89, and the collector is connected to the supply voltage bus 88 by way of a load impedance 94. A clamping diode 95 is connected between the transistor's base electrode and the reference bus 89. The emitter-base junction of transistor 85 is paralleled by the resistors 86 and 87 connected in series with each other, resistor 86 being connected to the emitter and resistor 87 to the base electrode. A resistor 96 is connected from the supply voltage bus 88 to the junction of resistors 86 and 87. (It is apparent therefore that the resistors 86 and 96 form a voltage divider, with a certain portion of the regulated supply voltage being impressed across resistor 86.) The resistor 87 and the D.-C. terminals of rectifier 82 are interconnected as shown, whereby the input signal when provided by the rectifier is applied across this resistor. The positive terminal of the rectifier 82 is connected to the junction of resistors 86 and 87, which point corresponds to the positive terminal of resistor 86, and a clamping diode 97 connects this junction to the supply voltage bus 88 for protection purposes.

The operation of the above-described level detecting circuit will now be explained. Under normal conditions the transistor 85 is biased into saturation (its conductive or active state) by current flowing from the supply voltage bus 88, through resistors 96 and 87, and in the forward direction through the emitter-base junction of the transistor. In this state the transistor 85 readily conducts load current, and a voltage of substantially constant magnitude, nearly equal to the magnitude of the supply voltage, is impressed across the load impedance 94. This condition continues so long as no input signal is being applied to the resistor 87.

When the sensor 46b detects the flow of ground current in the feeder circuit 20, a D.-C. input signal is fed through the bridge rectifier 82 to the resistor 87, and this signal is so poled as to increase the voltage drop across the resistor and reduce the magnitude of forward bias current in the emitter-base junction of transistor 85. As soon as the input signal increases to the aforesaid pickup magnitude (determined by the preselected voltage drop across resistor 86, which can be made quite low), forward bias current will stop flowing and the transistor is then rendered non-conductive (inactive). As a result, the transistor 85 can no longer conduct load current of appreciable magnitude, and the potential level of its collector rises abruptly in a positive sense. This operation is obtained in substantially instantaneous response to the incidence of a ground fault on the protected feeder 20, the D.-C. input signal derived therefrom being applied to the relay 36s in an unsmoothed, high-ripple state whereby no time is used for smoothing.

It should be noted here that the clamping diodes 95 and 97 keep the maximum voltage across resistor 87, at high multiples of pickup, from exceeding approximately the magnitude of the constant supply voltage appearing between buses 88 and 89 (excessive voltage generated by the sensor 46b being then absorbed in the filter 83), whereby the diodes comprising the bridge rectifier 82 are protected from damagingly high inverse voltages.

Immediately upon deactivation of the transistor 85 in the above-described manner, a positive-going output signal is developed at its collector. The collector is connected through a blocking diode 99 to electric energy storing means comprising a capacitor 100 and a resistor 101 in parallel circuit relationship between diode 99 and the reference bus 89, and the aforesaid output signal enables a voltage of appreciable magnitude to develop across this circuit. This voltage, when present across the energy storing circuit 100, 101 of the control means 81, is utilized to provide a monitoring signal for the main relay 35s and to activate the electroresponsive means 80 of the feeder relay 36s. The circuit is designed to sustain this voltage if the transistor 85 should become reactivated for intermittent brief intervals, as it will be, due to the high ripple content of the D.-C. input signal, when the amount of ground current in the feeder circuit 20 is only slightly above pickup. To the extent possible without compromising this function, the energy storing capacity of the circuit 100, 101 is minimized in order to obtain a relatively rapid rise of voltage upon deactivation of the transistor 85 and also for the sake of avoiding prolonged reset times. The blocking diode 99 will prevent the capacitor 100 from discharging through the transistor 85 when conductive, as during its brief intervals of activation which periodically recur under low-level input signal conditions.

As can be seen in FIG. 3, the relatively positive terminal of the capacitor 100 is connected to a diode 102 which in turn is connected to the output lead 50a of the feeder relay 36s. This lead is energized according to the voltage across capacitor 100, and the monitoring signal thus produced is conveyed by it to the main relay 35s by means of the interconnecting lead 48a. The diode 102 serves to isolate the capacitor 100 and the succeeding circuits connected thereto in the relay 36s from the monitoring signal which the companion feeder relay (not shown) supplies to the main relay, via lead 56a, upon the occurrence of an external ground fault in the other feeder circuit.

The voltage across capacitor 100 of the control means 81 is additionally utilized to activate the electroresponsive means 80 in the feeder relay 36s. In order to delay this activation if desired (for purposes of selective coordination between the feeder-disconnecting response of relay 36s and the operation of downstream protective devices, as explained hereinbefore), time delay means 103 is connected between the capacitor 100 and the electroresponsive means 80. As it is shown in FIG. 3, the time delay means 103 is a series RC circuit comprising a rheostat 104 and a capacitor 105. Activation of the electroresponsive means 80 is controlled by the voltage across capacitor 105 which charges, upon deactivation of transistor 85, in response to the charging of capacitor 100 but at a slower rate as determined by the time constant of the time delay means 103. It will be observed that the introduction of time delay at this point will not delay production by the feeder relay of the above-mentioned monitoring signal.

The electroresponsive means 80, as it is illustrated in FIG. 3, comprises a semi-conductor double-base diode 106 (known in the art as a unijunction transistor) and a solid state controlled rectifier 107. The positive terminal of the capacitor 105 is connected to the emitter of the unijunction transistor 106. Base-one of the unijunction transistor (the lower base electrode as viewed in FIG. 3) is connected to the reference bus 89 by way of a resistor 108, while base-two is connected to the supply voltage bus 88 by way of another base resistor 109. A connection is made between the gate electrode 107a of the controlled rectifier 107 and base-one of the unijunction transistor 106. The anode and cathode of the controlled rectifier are connected, respectively, to the output lead 52a of the relay 36s and directly to the reference bus 89, and a series combination of a resistor 110 and capacitor 111 forms surge suppressing means in parallel with the anode-cathode circuit of this component. As can be seen in FIG. 3, the companion output lead 53a of relay 36s is connected directly to the positive terminal of the control power source.

The shunt trip device 26 of the feeder breaker 22, whose opening operation is to be effected in response to operation of the relay unit 36s, is connected across the output leads 52a and 53a as is shown in FIG. 3. A tripping signal for energizing this device is supplied by the electroresponsive means 80 upon activation of the controlled rectifier 107. Until the controlled rectifier is triggered or activated by a small "gate" current in its gate electrode 107a, it is non-conductive and hence is in effect an open circuit, whereby no energizing current can flow through the lead 52a and the shunt trip device 26 in series therewith. When so triggered, however, the controlled rectifier 107 will abruptly change to a low-forward-impedance state which enables energizing current to flow from the control power source through the interconnected lead 53a, device 26 and lead 52a, thereby releasing the latch 28 and effecting opening of the associated feeder breaker. Its anode current then exceeds a predetermined minimum value (the "holding current") required to sustain conduction in a controlled rectifier of the type illustrated, and this component will remain active until the connected circuit is opened by the auxiliary contact 54 of the breaker 22, even if the gate signal were quickly removed.

The gate current required to trigger the controlled rectifier 107 is provided by the unijunction transistor 106 upon activation thereof. The unijunction transistor 106 will be inactive or cut off under normal conditions, when the potential of its emitter is less positive with respect to base-one than a characteristic peak point emitter voltage. But as soon as the voltage across the capacitor 105 of the time delay means 103 reaches this critical peak point voltage level, following deactivation of the transistor 85, the unijunction transistor fires and its interbase impedance abruptly decreases. This results in the flow of gate current in the gate electrode 107a, whereby the controlled rectifier becomes active and a tripping signal is supplied to the shunt trip device 26 as explained above. The time interval elapsing between the attainment of pickup magnitude by the D.-C. input signal for the feeder relay 36s and the firing of the unijunction transistor 106 of the electroresponsive means 80 is predetermined, as desired, by the setting of the rheostat 104.

Turning now to the detail circuitry of the main relay unit 35s shown in FIG. 3, it will be observed that this unit also comprises in essence two interconnected sections. One of these sections comprises normally inactive electroresponsive means 120 which, when activated, effects opening of the main circuit breaker 13 (FIG. 1) by supplying via output leads 38a and 39a a tripping signal to the shunt trip device 15 of this breaker. The other basic section of the main relay 35s comprises control means 121 which normally activates the electroresponsive means 120 in response to energization by a D.-C. input signal derived from current flowing in the grounding connection 17.

The input signal for the control means 121 of the main relay 35s is obtained from D.-C. terminals of a full-wave bridge rectifier 122. The A.-C. terminals of this rectifier are energized by an A.-C. signal taken from a current sensor 45b which comprises, as shown in FIG. 3, an air core transformer (known as a linear magnetic coupler) coupled to the grounding connection 17. This transformer develops a voltage representative of the current in the connection 17, and hence its voltage is dependent on the amount of ground fault current flowing from the power source through the main breaker 13 to an arcing ground fault (either internal or external) and returning to the source by way of the grounding path 17. A filter 123, similar to the filter 83 described hereinbefore, is connected between the transformer 45b and the rectifier 122, and an impedance-matching resistor 124 is connected across the A.-C. terminals of the rectifier as shown.

Operation of the main relay 35s is normally obtained when the input signal provided by the rectifier 122 attains a predetermined instantaneous pickup magnitude. This pickup magnitude is determined by the parameters of a level detecting circuit in the control means 121. The level detecting circuit comprises an NPN transistor 125, two interconnected resistors 126 and 127, and a pair of leads 128 and 129 energized by a regulated D.-C. supply voltage. The supply voltage is taken from across a voltage stabilizing element 130, shown in FIG. 3 as a Zener diode, which is connected in series with a dropping resistor 131 and a diode 132 to the control power source. A smoothing capacitor 133 is connected in parallel with the dropping resistor 131 and stabilizing element 130. The lead 128 is connected to the relatively positive terminal of element 130 and will be referred to hereinafter as a supply voltage bus, and the lead 129 will be referred to as a reference bus.

The emitter of the transistor 125 is connected directly to the reference bus 129, and the collector of this transistor is connected to the supply voltage bus 128 by way of a load impedance 134. The transistor's base electrode is clamped to the reference bus 129 by means of the combination of two diodes 135a and 135b connected in series and poled as shown. The emitter-base junction of transistor 125 is paralleled by the resistors 126 and 127 in series with each other, resistor 126 being connected to the emitter and resistor 127 to the base electrode through the diode 135a. A resistor 136 is connected from the supply voltage bus 128 to the junction of resistors 126 and 127. (It is apparent therefore that the resistors 126 and 136 form a voltage divider, with a certain portion of the regulated supply voltage being impressed across resistor 126.) The resistor 127 and the D.-C. terminals of rectifier 122 are interconnected as is shown in FIG. 3, whereby the input signal when provided by the rectifier is applied across this resistor. The positive terminal of the rectifier 122 is connected to the junction of resistors 126 and 127, which point corresponds to the positive terminal of resistor 126, and a clamping diode 137 connects this junction to the supply voltage bus 128 for protection purposes.

The above-described level detecting circuit of the control means 121 normally operates in a manner similar to that of the corresponding circuitry of the control means 81 in the feeder relay 36s. That is, the transistor 125 will be biased into saturation under normal conditions, and the D.-C. input signal applied to the resistor 127 must attain its aforesaid pickup magnitude (determined by the pre-selected voltage drop across resistor 126) in order to deactivate this transistor and allow a positive-going output signal to develop at its collector. However, the control means 121 of the main relay 35s has been connected, by way of lead 48a, to the control means 81 of the feeder relay 36s in a manner to prevent such deactivation of the transistor 125 whenever the above-mentioned monitoring signal is supplied thereto.

As can be seen in FIG. 3, the base electrode of the transistor 125 is connected to the lead 48a via the parallel combination of a resistor 138 and a capacitor 139. The transistor is maintained in its active state whenever the voltage level of the positive terminal of capacitor 100 in relay 36s is sufficient to cause current flow from that terminal, through leads 50a and 48a, and in the forward direction through the emitter-base junction of transistor 125. Thus the monitoring or blocking signal provided by a feeder relay upon the occurrence of an external ground fault will disable the level detecting circuit of the main relay 35s by rendering the transistor 125 conductive even though the D.-C. input signal being applied to the main relay by the rectifier 122 has attained its predetermined pickup magnitude. The diode 135a is provided to prevent diversion of the monitoring signal from the emitter-base junction of transistor 125, the capacitor 139 is used to expedite the response of this transistor to the monitoring signal when initially produced, and the resistor 138 enables the capacitor 100 to sustain its voltage while the transistor 125 is active.

The collector of the transistor 125 is connected through a blocking diode 140 to electric energy storing means comprising the series combination of a resistor 141 and a capacitor 142 connected in parallel with another resistor 143 between diode 140 and the reference bus 129. A voltage of appreciable magnitude is developed across this means upon deactivation of the transistor 125 in response to the input signal for the main relay 35s attaining its pickup magnitude in the absence of a monitoring signal from a feeder relay. Such a condition is indicative of the occurrence of a ground fault located internally and hence undetected by any feeder relay. The resulting voltage appearing across capacitor 142 is utilized to activate the electroresponsive means 120 in the main relay 35s.

As can be seen in FIG. 3, the electroresponsive means 120 of the main relay 35s is the same as the corresponding section 80 of the feeder relay 36s. It comprises a unijunction transistor 146 and a solid state controlled rectifier 147. The emitter of the unijunction transistor 146 is connected to the relatively positive terminal of the capacitor 142. Base resistors 148 and 149 are provided for interconnecting the respective base electrodes of the unijunction transistor 146 and, respectively, the reference bus 129 and the supply voltage bus 128. A connection is made between the gate electrode 147a of the controlled rectifier 147 and base-one of the unijunction transistor 146. The anode and cathode of the controlled rectifier are connected, respectively, to the output lead 38a of the relay 35s and to the reference bus 129, and a resistor 150 and capacitor 151 in series form surge suppressing means in parallel with the anode-cathode circuit of this component. As can be seen in FIG. 3, the companion output lead 39a of relay 35s is connected directly to the positive terminal of the control power source.

The shunt trip device 15 of the main breaker 13, whose opening operation is to be effected by operation of the relay unit 35s, is connected across the output leads 38a and 39a as is shown in FIG. 3. A tripping signal for energizing this device is supplied by the electroresponsive means 120 upon activation of the controlled rectifier 147. The gate current required to activate the controlled rectifier 147 is provided by the unijunction transistor 146 when the latter component is fired in response to the voltage across capacitor 142 reaching the critical level of the peak point emitter voltage of this component. The time required for the capacitor voltage to reach this critical level, following deactivation of the transistor 125, is dependent on the parameters of the resistor 141 and capacitor 142, and a delay of only a fraction of a power-frequency cycle at this point will ensure that the operation of the main relay 35s is blocked by a monitoring signal received from a feeder relay unit, under external ground fault conditions, before activation of the electroresponsive means 120 can be effected due to simultaneous energization of the main relay unit by an input signal exceeding pickup magnitude.

Figure 4:
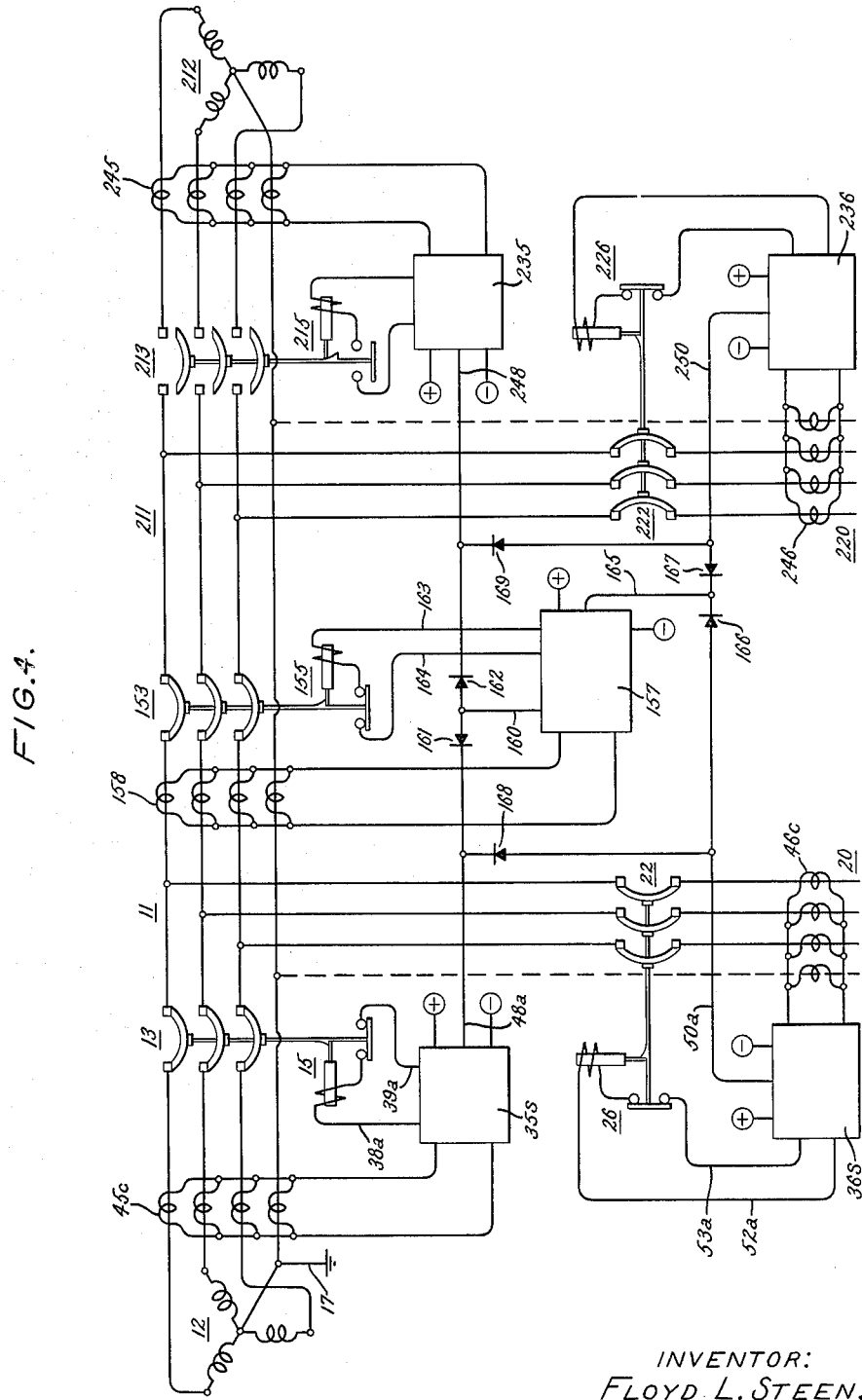
FIG. 4 is a schematic representation similar to FIG. 1 of a double-ended distribution apparatus protected against ground faults by my relaying system.

FIG. 4 depicts my relaying system applied to double-ended electric power distribution apparatus. In this embodiment of the invention I use two sets of the relay shown in FIG. 1 and described hereinbefore, in combination with a tie relaying unit which will be described below. As can be seen in FIG. 4, the apparatus comprises a pair of multiconductor electric power buses 11 and 211 respectively adapted for connection to two different sources of electric energy 12 and 212 by means including the illustrated switching means 13 and 213, respectively. The main switching means 13 is openable to disconnect the associated bus 11 and source 12, and the main switching means 213 is openable (as shown) to disconnect the associated bus 211 and source 212. Third switching means 153 is provided for interconnecting the buses 11 and 211 when closed (as shown). The three switching means 13, 153 and 213 are shown as circuit breakers equipped with shunt trip devices 15, 155 and 215, respectively.

The electric power bus 11 is tapped by at least one multiconductor feeder circuit 20 which is connected thereto by the circuit controlling means 22, shown as a circuit breaker having a shunt trip device 26. The distribution of power from the bus 11 is also controlled by the switching means 153 which will be referred to hereinafter as the tie breaker. The companion bus 211 is tapped by at least one multiconductor feeder circuit 220 which is connected thereto by circuit controlling means 222, shown as a circuit breaker having a shunt trip device 226.

The double-ended apparatus shown in FIG. 4 is selectively protected against ground faults, both internal and external, by my relaying scheme. This scheme includes a main relay unit 35s for the main breaker 13 and a feeder relay unit 36s for the feeder breaker 22, these units being the same as the main and feeder relays already described in connection with FIGS. 1 and 3. Note however in FIG. 4 that the current sensing means for deriving an energizing signal for the main relay 35s is shown as a plurality of parallel-connected current transformers 45c coupled to the respective conductors interconnecting the bus 11 and source 12, the net secondary current emanating therefrom being dependent on the amount of ground current flowing through the main breaker 13 under fault conditions. The ground current means associated with the feeder relay 36s is also shown in FIG. 4 as a plurality of parallel-connected current transformers 46c coupled to the respective conductors of the feeder circuit 20.

The relaying scheme of FIG. 4 further includes a second main relay unit 235 for the main breaker 213 and a separate feeder relay unit 236 for the feeder breaker 222. These additional units 235 and 236 are constructed and arranged the same as the main and feeder relays 35s and 36s, respectively. Thus the main relay 235 is normally operative to initiate an opening operation of the main breaker 213 in response to energization by an electric signal derived from ground current flowing through the main breaker as detected by current sensing means 245. The feeder relay 236 is responsive to energization by a signal derived by current sensor 246 from ground current flowing in the feeder circuit 220 for substantially and instantaneously disabling the main relay 235, to which it conveys a monitoring signal via the interconnecting leads 250 and 248, and for initiating a circuit opening operation of the feeder breaker 222.

The protective system of FIG. 4 also includes a tie relay unit 157 which is associated with the tie breaker 153 as shown. It is the function of this unit normally to respond to ground current flowing through the tie breaker by disabling both of the main relay units 35 and 235 and by effecting an opening operation of the tie breaker 153. The purpose of this arrangement will be apparent after considering a specific example. Assume that a ground fault occurs on the main bus 211 while the tie breaker is closed and both buses 11 and 211 are being supplied by the power source 12. The tie relay 157 will then operate to open the tie breaker and block operation of the main relay 35s, whereby only the affected bus is isolated from the source and the sound bus 11 can remain in service. In order to selectively coordinate with the feeder relay units 36s and 236 on the occurrence of an external ground fault condition, the tie relay 157 is additionally arranged to be disabled itself in substantially instantaneous response to operation of either one of these feeder relays.

Figure 5:
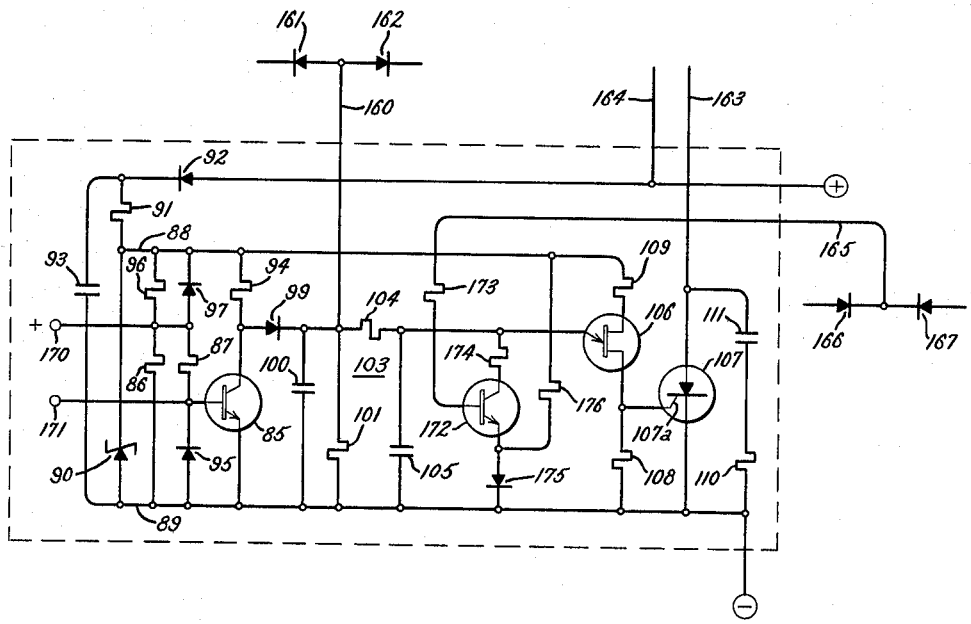
FIG. 5 is a circuit diagram of the tie relay shown in block form in FIG. 4.

The tie relay unit 157, the detail circuitry of which is shown in FIG. 5 soon to be described, is connected to ground current sensing means 158 for response to ground current flowing through the tie breaker 153. The sensing means 158, as is shown in FIG. 1, comprises a plurality of parallel-connected current transformers coupled to the respective conductors of the electric power bus 11 in close poximity to the tie breaker, and it derives an electric signal dependent on the flow of ground fault current at this point. The tie relay unit 157, being energized by the signal derived by the sensor 158, normally becomes operative when this signal attains a "pickup" magnitude indicative of the flow of ground current exceeding a predetermined amount through the tie breaker 153. The unit 157, immediately upon operation thereof, provides a monitoring signal at an output lead 160, and this monitoring signal is conveyed to both of the main relays 35s and 235 by the interconnections shown in FIG. 4. Isolating diodes 161 and 162 are provided in the connections from the output lead 160 to the leads 48a and 248, respectively.

Additional output leads 163 and 164 of the tie relay unit 157 are connected to the shunt trip device 155 of the tie breaker 153. A circuit opening operation of the tie breaker 153 is initiated upon energization of the shunt trip device 155 by a tripping signal conveyed thereto by the leads 163 and 164 in response to operation of the tie relay.

As can be seen in FIG. 4, the tie relay unit 157 is interconnected, by means of still another lead 165 and two isolation diodes 166 and 167, to the leads 50a and 250 of the feeder relay units 36s and 236, respectively. The tie relay 157 is so arranged that its operation is blocked by the monitoring signals which are conveyed to it by these interconnections in response to ground current flowing through any one of the feeder breakers 22 and 222. This blocking or disabling action prevents the tie relay unit from effecting opening of the tie breaker 153 in the event of an external ground fault. Note that the connection between lead 50a of the feeder relay 36s and lead 48a of the main relay 35s includes a diode 168 poled as shown for isolation purposes, and the connection between lead 250 of feeder relay 236 and lead 248 of main relay 235 includes a similar isolating diode 169.

FIG. 5 is a detail circuit diagram of a preferred embodiment of the tie relay unit 157 shown in block form in FIG. 4, and it will now be described. The tie relay includes the same circuitry as the feeder relay 36s shown in FIG. 3 and described in detail above, and I have used like reference numbers in FIG. 5 to identify the like components. A D.-C. input signal for energizing the tie relay, which signal is derived from ground current flowing through the tie breaker by means of the current sensor 158 and a full-wave bridge rectifier (not shown in FIG. 5), is applied to a pair of input terminals 170 and 171 and hence to the resistor 87. The mode of operation of the control means 81 of the tie relay, in response to the attainment by the input signal of a predetermined pickup magnitude, is like that explained before in connection with the feeder relay 36s, and it will not be repeated here. The resulting monitoring signal provided at the output lead 160, which is connected to the positive terminal of capacitor 100 as shown in FIG. 5, will be conveyed through isolating diodes 161 and 162 to the main relays 35s and 235, respectively, whereby both of the main relays are disabled substantially instantaneously in response to operation of the control means 81 of the tie relay 157.

At the same time the monitoring signal is produced by the control means 81 of the tie relay, time delay means 103 is energized, and subsequently the normally inactive electroresponsive means 80 of this relay is activated. As a result, a tripping signal is produced at the output leads 163 and 164 of the tie relay, and the shunt trip device 155 connected thereto is energized to effect opening of the tie breaker 153 (FIG. 4). This last-mentioned operation of the tie relay 157 can, however, be blocked or prevented by a monitoring signal received from either one of the feeder relay units 36s and 236.

The tie relay 157 includes means 172, connected to the lead 165 as can be seen in FIG. 5, for disabling its electroresponsive means 80 in response to energization of the lead 165 by a monitoring signal when provided by either feeder relay 36s or 236. Such a signal will be conveyed to the lead 165, through isolating diodes 166 or 167, respectively, upon operation of either feeder relay in response to ground current flowing in the associated feeder circuit on the incidence of an external ground fault. The disabling means 172 as illustrated comprises an NPN transistor having base electrode connected by way of a current limiting resistor 173 to lead 165. The collector of the transistor 172 is connected through a resistor 174 to the emitter of the unijunction transistor 106, and the emitter of 172 is connected to the reference bus 89 through a diode 175 poled as shown. Thus the emitter-collector circuit of the transistor 172 shunts the timing capacitor 105. A resistor 176 connects the diode 175 to the supply voltage bus 88, and in the absence of any monitoring signal a reverse bias is applied to the transistor 172. Therefore this transistor normally is in a non-conductive, high-impedance state in which it has no discernable affect on the usual operation of the electroresponsive mens 80.

Whenever one of the feeder relay units becomes operative, however, a monitoring signal is supplied to the tie relay 157 which will cause current flow through the lead 165, resistor 173, and in the forward direction through the emitter-base junction of transistor 172 and the diode 175 in series therewith. This biases the transistor into conduction, and the resulting low-impedance state thereof prevents the build up of sufficient voltage across capacitor 105 to fire the unijunction transistor 106. Thus the monitoring or blocking signal provided by a feeder relay upon the occurrence of an external ground fault will disable the electroresponsive means 80 of the tie relay by preventing the firing of the unijunction transistor 106 even though the D.-C. input signal being applied to terminals 170 and 171 has attained its predetermined pickup magnitude.

While I have shown and described my invention in several different forms, it will be apparent to those skilled in the art that there are still other modifications and alternative forms that the invention might take. I contemplate, therefore, by the concluding claims to cover all such changes and modifications as fall within the true spirit and scope of my invention.

What I claim as new and desired to secure by United States Letters Patent is:

1. In electric power switchgear:
   (a) a multiconductor polyphase A.-C. electric power bus;
   (b) switching means for connecting said bus to a source of polyphase A.-C. electric energy having one terminal adapted for grounding, the switching means being equipped with a normally deenergized trip coil and being openable to disconnect the bus from the source upon energization of said trip coil;
   (c) main relaying means connected to said trip coil and activated by ground current flowing through said switching means for effecting energization of said trip coil;
   (d) a plurality of circuit controlling means for connecting a plurality of feeder circuits respectively to said bus; and
   (e) a plurality of feeder relaying means respectively connected to said circuit controlling means, all of the feeder relaying means being connected in common to said main relaying means and each of them being responsive to ground current flowing through said switching means and through the associated circuit controlling means for substantially instantaneously preventing activation of said main relaying means, thereby rendering it ineffective to open the switching means, and for effecting a circuit opening operation of the associated controlling means.

2. Electric power distribution apparatus comprising:
   (a) first and second multiconductor electric power buses;
   (b) first and second switching means for respectively connecting said buses to two different sources of electric energy, each switching means being openable to disconnect the associated bus and source;
   (c) third switching means for interconnecting said buses, the third switching means being openable to disconnect the buses;
   (d) first circuit controlling means for connecting at least one multiconductor feeder circuit to said first bus;
   (e) second circuit controlling means for connecting at least one other multiconductor feeder circuit to said second bus;
   (f) a grounded metal structure for housing said buses, said switching means and said circuit controlling means; and
   (g) a ground fault protective system comprising:
      (i) first and second main relaying means respectively connected to said first and second switching means, each of said main relaying means being normally responsive to ground current flowing through the associated switching means for initiating an opening operation thereof,
      (ii) tie relaying means connected to said third switching means and responsive to ground current flowing therethrough for substantially instantaneously disabling both of said main relaying means, thereby preventing the initiation of an opening operation of either one of said first and second switching means, while effecting an opening operation of the third switching means,
      (iii) first feeder relaying means connected to said first circuit controlling means and responsive to ground current flowing therethrough for substantially instantaneously disabling said first main relaying means and said tie relaying means, thereby preventing the opening of either one of said first and third switching means, and for initiating an opening operation of the first circuit controlling means, and
      (iv) second feeder relaying means connected to said second circuit controlling means and responsive to ground current flowing therethrough for substantially instantaneously disabling said second main relaying means and said tie relaying means, thereby preventing opening of either one of said second and third switching means, and for initiating an opening operation of the second circuit controlling means.

3. In electric power distribution apparatus which is energized from a source of electricity, the apparatus including a multiconductor electric power bus connected to the source by way of a main circuit breaker openable to deenergize the bus, with at least two other circuit breakers being connected to the bus to control the distribution of power therefrom, the combination comprising:
   (a) first current sensing means for deriving a first electric signal in response to ground current flowing through a first one of said two other circuit breakers;
   (b) first relaying means connected to said first current sensing means and adapted to be connected to said first circuit breaker for initiating circuit opening thereof in response to energization by said first signal;
   (c) second current sensing means for deriving a second electric signal in response to ground current flowing through the second one of said two other circuit breakers;
   (d) second relaying means connected to said second current sensing means and adapted to be connected to said second circuit breaker for initiating circuit opening thereof in response to energization by said second signal, said second relaying means including means connected to said first relaying means for preventing the second relaying means from effecting opening of the second circuit breaker when said first relaying means is energized by said first signal;
   (e) third current sensing means for deriving a third electric signal in response to ground current flowing through said main circuit breaker; and
   (f) third relaying means connected to said third current sensing means and adapted to be connected to the main circuit breaker for initiating opening thereof in response to energization by said third signal, said third relaying means including means connected to both the first and second relaying means for preventing the third relaying means from effecting opening of the main circuit breaker when either the first relaying means is energized by the first signal or the second relaying means is energized by the second signal.

4. In a ground fault protective system for electric power distribution apparatus which is energized from a source of electricity, the apparatus including a multiconductor electric power bus connected to the source by way of switching means openable to deenergize the bus, with at least one circuit controlling means connecting at least one multiconductor feeder circuit to the bus and openable to disconnect the feeder circuit from the bus, the combination comprising:
   (a) first ground current sensing means for deriving a first D.-C. energizing signal in response to ground current flowing through the circuit controlling means;
   (b) a first electromagnetic relay supplied by said first energizing signal and operative to initiate opening operation of the circuit controlling means when the first signal attains a predetermined magnitude;
   (c) second ground current sensing means for deriving a second D.-C. energizing signal in response to ground current flowing through the switching means; and
   (d) a second electromagnetic relay supplied by said second energizing signal and operative to initiate opening operation of the switching means when the second signal attains said predetermined magnitude;

(e) said second electromagnetic relay including means connected to said first current sensing means for blocking operation of the second relay whenever the magnitude of the first energizing signal exceeds an amount equal to the magnitude of the second signal less said predetermined magnitude.

5. In a ground fault protective system for electric power distribution apparatus which is energized from a source of electricity, the apparatus including a multiconductor electric power bus connected to the source by way of switching means openable to deenergize the bus, with at least one circuit interrupter connecting at least one multiconductor feeder circuit to the bus and openable to disconnect the feeder circuit from the bus, the combination comprising:

(a) means for deriving a first input signal dependent on the flow of ground current through the circuit interrupter;

(b) feeder relaying means adapted to be connected to the circuit interrupter for initiating an opening operation thereof in response to said first input signal attaining a predetermined magnitude, said feeder relaying means including:
  (i) normally inactive electroresponsive means for effecting, when activated, the opening operation of the circuit interrupter and
  (ii) first control means arranged to be energized by said first input signal for producing a blocking signal and for activating said electroresponsive means when said first input signal attains said predetermined magnitude;

(c) means for deriving a second input signal dependent on the flow of ground current through the switching means; and (d) main relaying means adapted to be connected to the switching means for initiating an opening operation thereof in response to said second input signal attaining a predetermined magnitude, said main relaying means including:
  (i) normally inactive electroresponsive means for effecting, when activated, the opening operation of the switching means and
  (ii) second control means arranged to be energized by said second input signal for activating the last-mentioned electroresponsive means in response to the second input signal attaining said predetermined magnitude, the second control means being connected to said first control means and being disabled in substantially instantaneous response to the production of said blocking signal, whereby the main relaying means cannot effect opening of the switching means whenever said first input signal has attained its predetermined magnitude.

6. The ground fault protective system of claim 5 in which the feeder relaying means includes time delay means connected between the first control means and the first-mentioned electroresponsive means for delaying activation of said electroresponsive means for a predetermined time interval following the attainment by the first input signal of its predetermined magnitude.

7. In a ground fault protective system for electric power distribution apparatus which is energized from a source of A.-C. electricity, the apparatus including a multiconductor electric power bus connected to the source by way of switching means openable to deenergize the bus, with at least one circuit interrupter connecting at least one multiconductor feeder circuit to the bus and openable to disconnect the feeder circuit from the bus, the combination comprising:

(a) means for deriving a first D.-C. signal dependent on the flow of ground current through the circuit interrupter;

(b) feeder relaying means adapted to be connected to the circuit interrupter for initiating an opening operation thereof in response to said first signal attaining a predetermined instantaneous magnitude, said feeder relaying means including:
  (i) normally inactive electroresponsive means for effecting, when activated, the opening operation of the circuit interrupter and
  (ii) first control means arranged to be energized by said first signal for producing a monitoring signal and for activating said electroresponsive means when said first signal attains said predetermined instantaneous magnitude, said first control means including energy storing means for sustaining said monitoring signal once produced;

(c) means for deriving a second D.-C. signal dependent on the flow of ground current through the switching means; and (d) main relaying means adapted to be connected to the switching means for initiating an opening operation thereof in response to said second signal attaining a predetermined instantaneous magnitude, said main relaying means including:
  (i) normally inactive electroresponsive means for effecting, when activated, the opening operation of the switching means and
  (ii) second control means arranged to be energized by said second signal for activating the last-mentioned electroresponsive means in response to the second signal attaining said predetermined instantaneous magnitude, said second control means being connected to said first control means and being disabled in substantially instantaneous response to the production of said monitoring signal, whereby the main relaying means cannot effect opening of the switching means whenever said first signal has attained its predetermined magnitude.

8. In a ground fault protective system for electric power distribution apparatus which is energized from a source of electricity, the apparatus including a multiconductor electric power bus, adapted for connection to the source by way of switching means openable to deenergize the bus, and at least one circuit controlling means for connecting at least one multiconductor feeder circuit to the bus and openable to disconnect the feeder circuit from the bus, the combination comprising:

(a) feeder relaying means adapted to be connected to the circuit controlling means and operative in response to arcing ground fault current flowing therethrough for initiating opening thereof;

(b) main relaying means adapted to be connected to the circuit controlling means and operative in response to arcing ground fault current flowing therethrough for initiating opening thereof; and (c) means interconnecting said feeder and main relaying means for preventing activation of the main relaying means in response to arcing ground fault current flowing through the circuit controlling means.

9. In a ground fault protective system for electric power distribution apparatus which is energized from a source of electricity, the apparatus including: a multiconductor electric power bus, adapted for connection to the source by way of switching means openable to deenergize the bus, and at least one circuit controlling means for connecting at least one feeder circuit to the bus and openable to disconnect the feeder circuit from the bus, the combination comprising:

(a) feeder relaying means responsive to ground current flowing through the circuit controlling means for producing a monitoring signal and for initiating opening of the circuit controlling means, the feeder relay comprising:

21

(i) first control means including a normally active first transistor arranged for deactivation in response to ground current flowing through the circuit controlling means, said monitoring signal being produced by the first control means in substantially instantaneous response to the deactivation of said first transistor; and (ii) first electroresponsive means connected to said first control means and adapted to be connected to the circuit controlling means for initiating opening thereof in response to the deactivation of said first transistor; and (b) main relaying means normally responsive to ground current flowing through the switching means for initiating opening thereof, the main relaying means comprising:

(i) second control means including a normally active second transistor arranged for deactivation in response to ground current flowing through the switching means, (ii) the second control means being connected to said first control means for energization by said monitoring signal when produced and the second transistor being maintained active so long as the monitoring signal is energizing the second control means, even though ground current is then flowing through the switching means, and (iii) second electroresponsive means connected to said second control means and adapted to be connected to the switching means for initiating opening thereof in response to the deactivation of said second transistor.

10. In combination:

(a) first relaying means responsive to energization by a first input signal for producing a monitoring signal and for performing a first predetermined control function, the first relaying means comprising:

(i) first control means including a normally active first transistor arranged for deactivation in response to said first signal being applied to the first control means, said monitoring signal being produced by the first control means in substantially instantaneous response to the deactivation of said first transistor, (ii) the first control means including energy storing means for sustaining said monitoring signal once produced, and (iii) first electroresponsive means connected to said first control means for performing said first predetermined control function in response to the deactivation of said first transistor; and (b) second relaying means normally responsive to energization by a second input signal for performing a second predetermined control function, the second relaying means comprising:

(i) second control means including a normally active second transistor arranged for deactivation in response to said second input signal being applied to the second control means, (ii) the second control means being connected to said first control means for energization by said monitoring signal when produced and the second transistor being maintained active so long as the monitoring signal is energizing the second control means, even though the second input signal is concurrently applied thereto, and (iii) second electroresponsive means connected to said control means for performing said second predetermined control function in response to the deactivation of said second transistor.

22

11. An electric level detecting circuit comprising:

(a) first and second D.-C. supply voltage terminals, the first terminal being of predetermined polarity relative to the second terminal;

(b) a voltage divider connected between the supply voltage terminals;

(c) a resistor connected to said first supply voltage terminal by way of a preselected portion of the voltage divider;

(d) current responsive means;

(e) means for connecting the current responsive means between said first supply voltage terminal and the resistor in parallel circuit relationship with said preselected portion of the voltage divider and the resistor in series, the current responsive means being operative to produce an output control signal in response to a predetermined change in current conduction in said connecting means;

(f) a full-wave rectifier having a pair of A.-C. terminals and first and second D.-C. terminals, the first D.-C. terminal having said predetermined relative polarity with respect to the second D.-C. terminal of the rectifier, (g) means for connecting said resistor across the D.-C. terminals of said rectifier, with said first D.-C. terminal of said rectifier being common to the interconnection of said current responsive means and said resistor;

(h) a pair of input terminals adapted to be energized by an A.-C. voltage of variable magnitude;

(i) means including impedance means for interconnecting the input terminals and the A.-C. terminals of said rectifier; and (j) first and second clamping diodes for preventing the maximum voltage across the D.-C. terminals of said rectifier from appreciably exceeding the magnitude of the supply voltage, the first diode being connected between said first supply voltage terminal and first D.-C. terminal of the rectifier and being poled to conduct current whenever the potential of the latter terminal has said predetermined polarity relative to the the former, and the second diode being connected between said second supply voltage terminal and said second D.-C. terminal of the rectifier and being poled to conduct current whenever the potential of the latter terminal has a polarity, relative to the former terminal, which is opposite to said predetermined polarity.

12. The level detecting circuit of claim 11 in which said impedance means comprises a low pass filter tuned to the fundamental frequency of said A.-C. voltage.

References Cited by the Examiner

UNITED STATES PATENTS

| 1,705,687 | 3/1929 | Sleeper. | |
|---|---|---|---|
| 1,722,419 | 7/1929 | Heinisch | 317—45 |
| 1,734,874 | 11/1929 | Norberg | 317—18 |
| 1,822,255 | 9/1931 | Walty | 317—35 |
| 2,020,972 | 11/1935 | Starr | 317—14.4 X |
| 2,272,991 | 2/1942 | Hanna | 317—29 X |

FOREIGN PATENTS 446,299   4/1936   Great Britain.

MILTON O. HIRSHFIELD, *Primary Examiner.*

SAMUEL BERNSTEIN, *Examiner.*

R. V. LUPO, *Assistant Examiner.*